(12) United States Patent
Takemoto

(10) Patent No.: US 6,417,833 B1
(45) Date of Patent: Jul. 9, 2002

(54) LIQUID CRYSTAL DISPLAY APPARATUS AND METHOD FOR LIGHTING BACKLIGHT THEREOF

(75) Inventor: Takahiro Takemoto, Tokyo (JP)

(73) Assignee: NEC Corporation (JP)

( * ) Notice: Subject to any disclaimer, the term of this patent is extended or adjusted under 35 U.S.C. 154(b) by 164 days.

(21) Appl. No.: 09/591,580

(22) Filed: Jun. 9, 2000

(30) Foreign Application Priority Data

Jun. 11, 1999 (JP) .......................................... 11-165393

(51) Int. Cl.[7] ................................................ G09G 3/36

(52) U.S. Cl. ........................ 345/102; 345/60; 345/63; 345/204; 345/211; 345/212; 345/213; 313/463; 315/56; 315/169.3; 315/169.4; 348/798; 348/790; 348/797; 348/800

(58) Field of Search ............................. 345/102, 60, 61, 345/63, 66, 204, 211–213; 313/493, 571, 577, 477 R; 315/56, 86, 160, 167, 168, 169.3, 169.4, 158, 493, 634; 348/798, 790, 792, 793, 795, 797, 800

(56) References Cited

FOREIGN PATENT DOCUMENTS

JP 4-241320 * 8/1992 ......... G02F/1/1335

* cited by examiner

Primary Examiner—Richard Hjerpe
Assistant Examiner—Henry N. Tran
(74) Attorney, Agent, or Firm—Hayes Soloway P.C.

(57) ABSTRACT

In the liquid crystal display, a first backlight and a second backlight are provided and lightened simultaneously. Among all the lamps constituting the backlight, those lamps outputting oscillation waves in one phase are made equal or nearly equal in number to those lamps outputting oscillation waves in the phase opposite to the phase mentioned above.

16 Claims, 8 Drawing Sheets

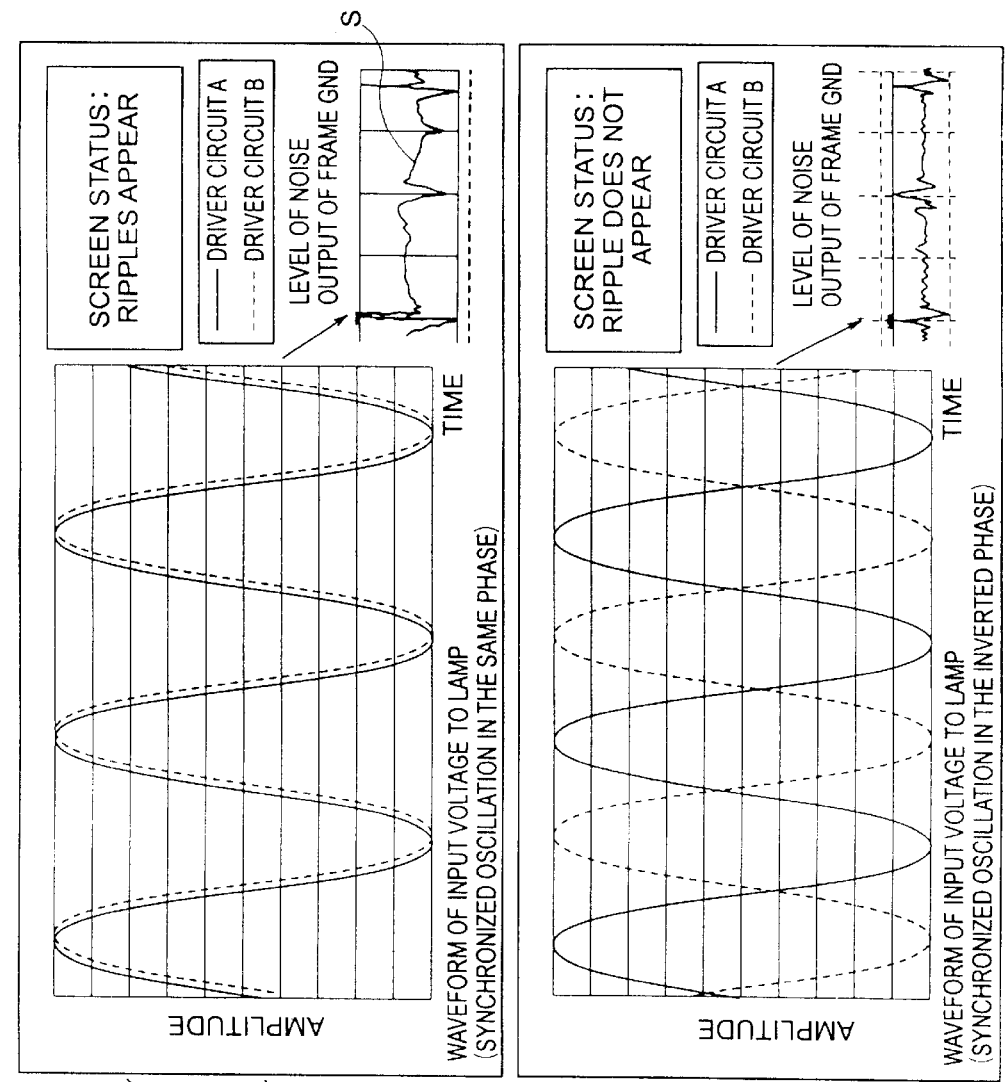

LIQUID CRYSTAL DISPLAY APPARATUS AND METHOD FOR LIGHTING BACKLIGHT THEREOF

BACKGROUND OF THE INVENTION

1. Field of the Invention

The present invention relates to a liquid crystal display apparatus and a method for lighting a backlight thereof. More specifically, the present invention relates to a liquid crystal display apparatus that can reduce noises so as to improve a quality of display and a method for lighting a backlight thereof.

2. Description of the Related Art

A liquid crystal display apparatus illuminates a liquid crystal panel using a backlight so as to realize an image by the difference of partial transparency of the liquid crystal panel. Conventionally, the backlight is driven by an oscillation wave having a single frequency. The phase of the oscillation wave is synchronized in the entire of the backlight (see Japanese Patent Laid-open Publication No. 11-3039 and No. 4-241320).

FIG. 1 is a block diagram showing a conventional apparatus for lighting the backlight. In FIG. 1, a driver circuit 41 drives lamps 45 and 46, while a driver circuit 42 drives lamps 47 and 48. In the same way, a driver circuit 44 drives lamps 51 and 52. Lamps 47 through 52 are driven in the same period and in synchronization with that of oscillation waves of the lamps 45 and 46. This configuration enables to light all lamps in the same period and in synchronization with each other. FIG. 2 is a block diagram showing another conventional apparatus for lighting the backlight. In the apparatus for lighting the backlight as shown in FIG. 2, a single driver circuit drives one lamp. In this configuration too, the lamps 45 through 62 are driven by the oscillation waves having the same period and are in synchronization with each other. Thus, all lamps are lighted in the same period and in synchronization with each other.

Next, the reason why all lamps should be driven in the same period and in synchronization with each other will be explained. If the oscillation waves for driving the lamps are not synchronized with each other, plural lamp oscillations will be interfered to each other, and a large interference noise will be generated periodically. This will appear and disappear on the display screen periodically to be a noise, and generates a so-called "ripple phenomenon". In order to avoid this, the oscillation waveforms of all lamps are oscillated in the same period and in synchronization with each other as shown in FIG. 3. If the oscillation waves of the lamps are not synchronized, the composed waveform varies along time, and a horizontal synchronization frequency of a video signal that generates the ripple cannot be specified, so that a ripple noise will be generated regardless of a video input mode. Furthermore, in the conventional apparatus for lighting a backlight, the lamp oscillation frequency is selected so that the oscillation wave does not interfere the horizontal synchronization signal.

However, the conventional apparatus for lighting a backlight has a following problem. In a multiscanning monitor, plural horizontal synchronization frequencies are used, while the lamp oscillation frequency is fixed. Therefore, the interference of the horizontal synchronization signal with the lamp oscillation wave cannot be avoided. Far this reason, the lamp oscillation frequency is selected so that only one frequency that is mainly used is not interfered. Accordingly, some of the horizontal synchronization frequencies can be always interfered, resulting in a generation of the "ripple phenomenon".

In addition, because of the synchronization, when the horizontal synchronization signal of the video signal is interfered with the oscillation frequency of the inverter, the ripple noise on the display further grow with an increasing number of the lamps.

SUMMARY OF THE INVENTION

An object of the present invention is to provide a liquid crystal display apparatus with improved quality of display and a method for lighting the backlight thereof by eliminating the ripple noise due to the interference between the oscillation wave of the backlight and the horizontal synchronization signal in a multiscanning monitor so as to educe the noise in a liquid crystal panel.

A liquid crystal display apparatus according to the present invention includes a first backlight and a second backlight which are driven simultaneously. The second backlight has an oscillation wave whose phase is inverted with respect to an oscillation wave of the first backlight.

A method for lighting a backlight of a liquid crystal display apparatus according to the present invention includes the steps of lighting the first backlight and lighting the second backlight simultaneously with the first backlight by inverting the phase of the oscillation waveform with respect to the oscillation waveform of the first backlight.

According to the present invention, the sine wave noise can be canceled since there are the first and the second backlight whose phases of the oscillation waveforms are opposite to each other. Therefore, the generation of the ripple phenomenon can be suppressed, and the noise due to the ripple phenomenon can be eliminated, so that a liquid crystal display apparatus with improved quality of display can be provided.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 9 shows a result of measuring noises in the embodiment of the present invention;

DETAILED DESCRIPTION OF THE PREFERRED EMBODIMENTS

Hereinafter, preferred embodiments of the present invention will be explained in detail with reference to the attached drawings.

Figure 4:
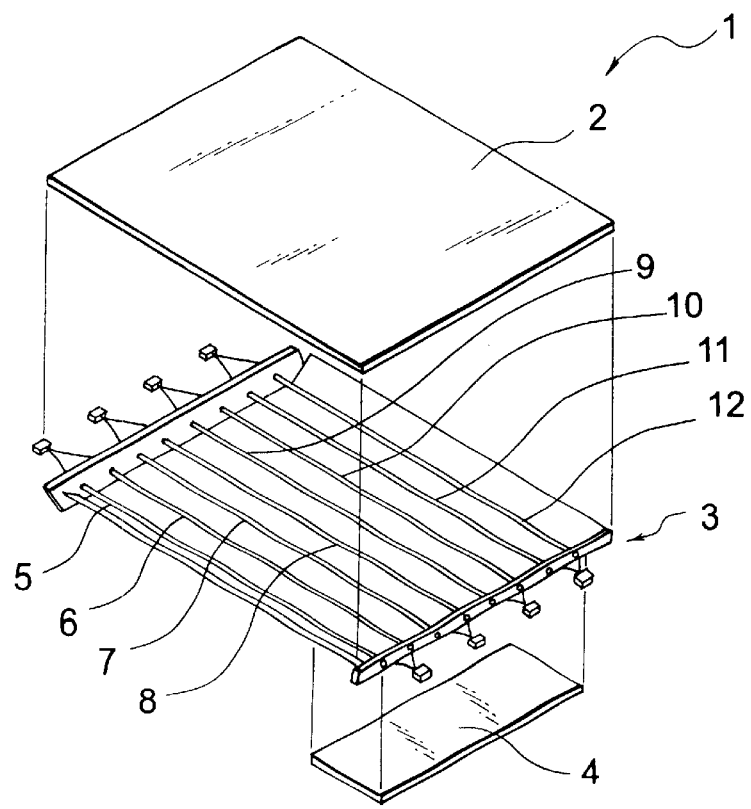
FIG. 4 is a perspective view showing a configuration of the liquid crystal display apparatus according to an embodiment of the present invention.
Figure 5:
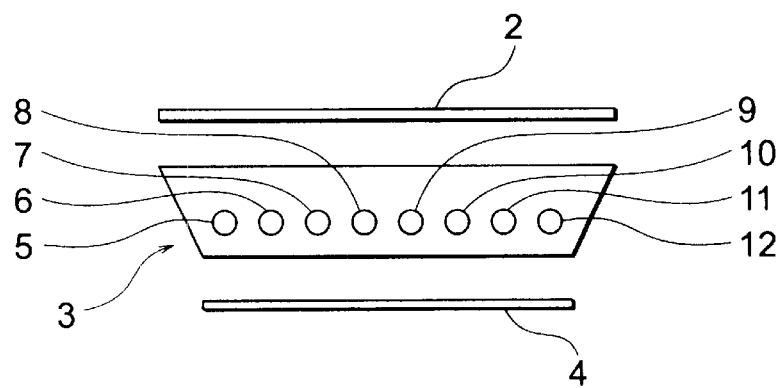
FIG. 5 is a cross section showing a configuration of the liquid crystal display apparatus according to the embodiment of the present invention.

First, the first embodiment of the present invention will be explained. FIG. 4 is a perspective view showing a configuration of the liquid crystal display apparatus according to the first embodiment of the present invention. FIG. 5 is a cross section showing a configuration of the liquid crystal display apparatus of the first embodiment. As shown in FIG. 4, the liquid crystal display apparatus 1 includes a liquid crystal panel 2, a backlight 3 for illuminating the liquid crystal panel 2, and a video signal processing board 4 for driving the liquid crystal panel 2. The backlight 3 includes a plurality of lamps, i.e., lamps 5 through 12. Though there are eight lamps in this embodiment, any number of lamps more than or equal to two can be used. As shown in FIG. 5, the liquid crystal panel 2 is positioned on the illumination surface of the backlight 3, and the video signal processing board 4 is positioned under the backlight 3. The lamps 5 through 12 are arranged at a predetermined pitch in the backlight 3.

Figure 6:
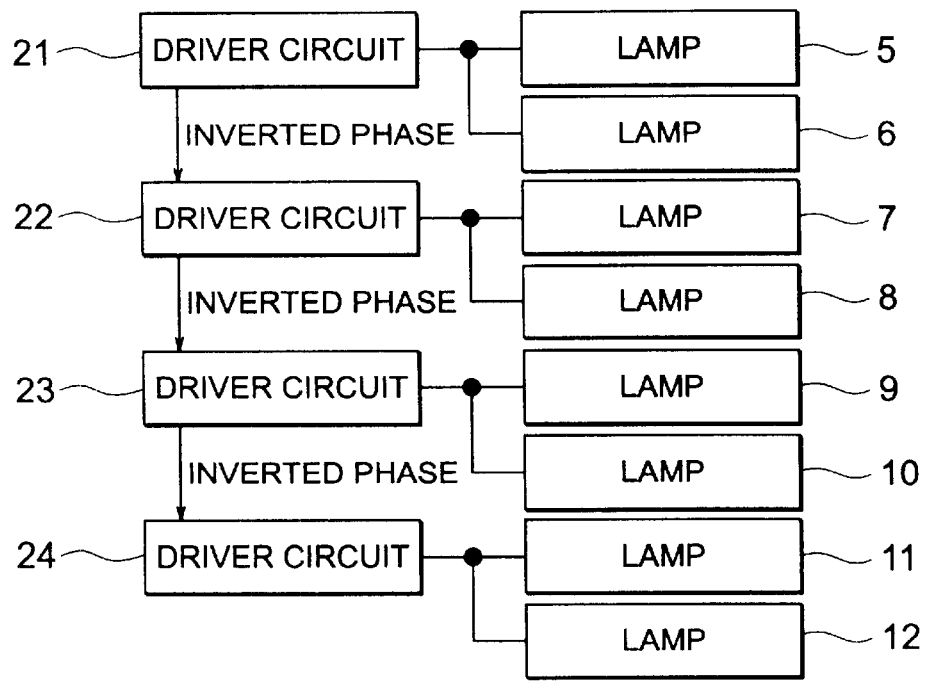
FIG. 6 is a block diagram showing the configuration of the liquid crystal display apparatus according to the embodiment of the present invention.

FIG. 6 is a block diagram showing the liquid crystal display apparatus according to the first embodiment. The output signal of the driver circuit 21 for driving the lamps 5 and 6 is given to the driver circuit 22 for driving the lamps 7 and 8. The output signal of the driver circuit 22 is given to the driver circuit 23 for driving the lamps 9 and 10. The output signal of the driver circuit 23 is given to the driver circuit 24 for driving the lamps 11 and 12. In addition, the oscillation wave that is outputted by the driver circuit 21 is given to the lamps 5 and 6. The oscillation waste that is outputted by the driver circuit 22 is given to the lamps 7 and 8. The oscillation wave that is outputted by the driver circuit 23 is given to the lamps 9 and 10. The oscillation wave that is outputted by the driver circuit 24 is given to the lamps 11 and 12.

Next, the operation of this embodiment will be explained. As shown in FIG. 6, the oscillation wave outputted by the driver circuit 21 is given to the lamps 5 and 6 so as to drive them. The signal that is outputted by the driver circuit 21 is given to the driver circuit 22. The driver circuit 22 outputs the oscillation wave whose phase is inverted with respect to the oscillation wave of the driver circuit 21, and the oscillation wave is given to the lamps 7 and 8 so as to drive them. In the same way, the signal that is outputted by the driver circuit 22 is given to the driver circuit 23. The driver circuit 23 outputs the oscillation wave to the lamps 9 and 10, the phase of the oscillation wave being inverted with respect to the oscillation wave of the driver circuit 22, so as to drive the lamps 9 and 10. In addition, the signal that is outputted by the driver circuit 23 is given to the driver circuit 24. The driver circuit 24 outputs the oscillation wave to the lamps 11 and 12, the phase of the oscillation wave being inverted with respect to the oscillation wave of the driver circuit 23, so as to drive the lamps 11 and 12.

Figure 7:
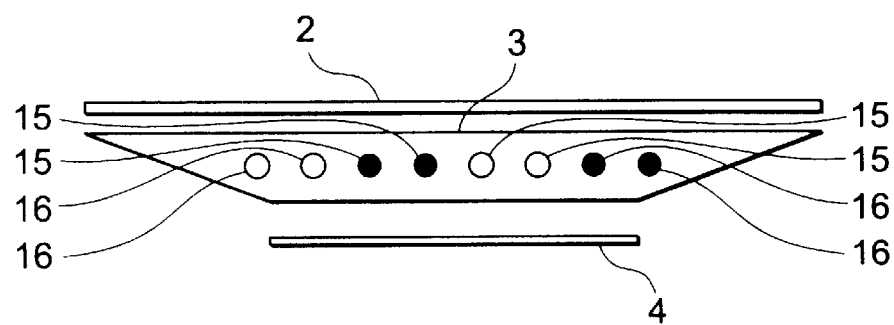
FIG. 7 is a cross section showing the driving state of the lamps 5 through 12 according to the embodiment of the present invention.

As a result, the lamps 5, 6, 9 and 10 constitute a first backlight; 15 having the same period and oscillating in synchronization, while the lamps 7, 8, 11 and 12 constitute a second backlight 16 having the opposite phase to the first backlight 15 and oscillating in synchronization. FIG. 7 is a cross section showing the driving state of the lamps 5 through 12. The number of the lamps constituting the first backlight 15 is the same as that constituting the second backlight 16. The lamps of the first and second backlights 15 and 16 are arranged alternately two by two.

Figure 8:
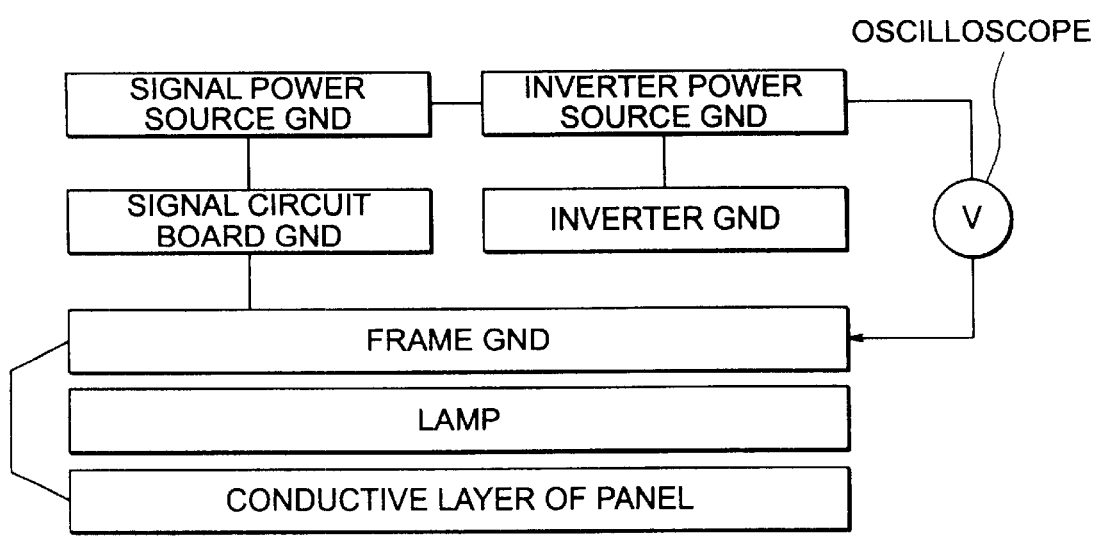
FIG. 8 is a block diagram of a circuit that is used for measuring noises in the embodiment of the present invention.

Next, the effect of this embodiment will be explained. The liquid crystal display apparatus of this embodiment was used for performing a noise generation test. FIG. 8 is a block diagram of a circuit that was used for the test. As an input condition, a signal power source was OFF, a video signal input was also OFF, and only an inverter power source for the backlight was turned on, so as to observe a noise signal that was generated on the ground line with an oscilloscope. In addition, the display screen of the liquid crystal display apparatus was observed to study the state of the noise.

Figure 1:
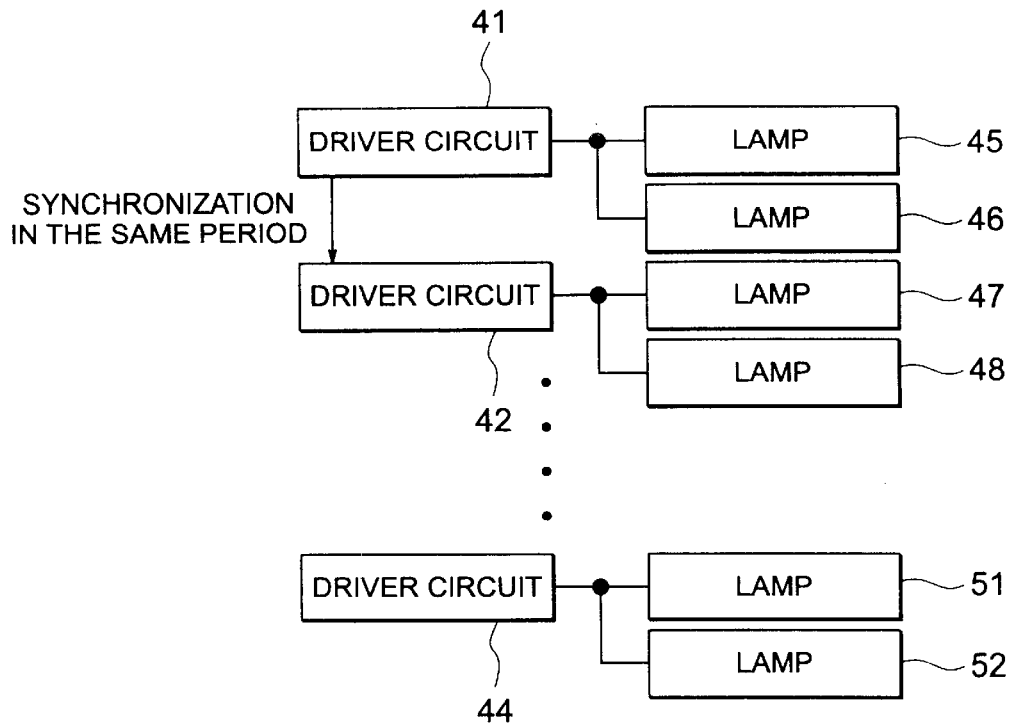
FIG. 1 is a block diagram showing a conventional apparatus for lighting the backlight.
Figure 2:
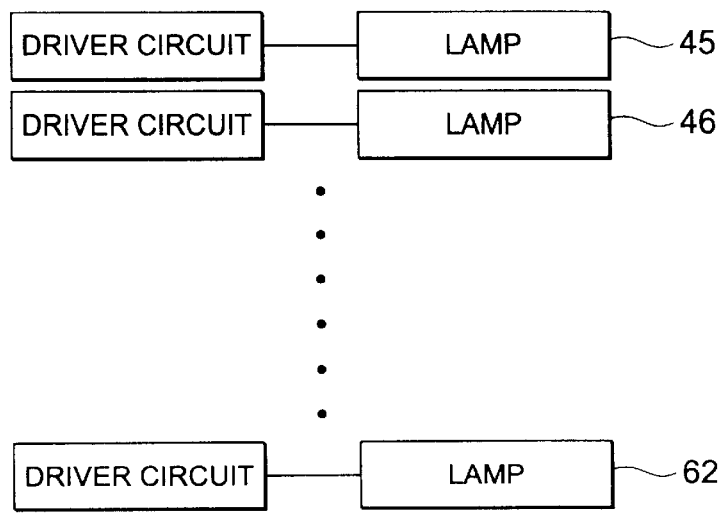
FIG. 2 is a block diagram showing another conventional apparatus for lighting the backlight.
Figure 3:
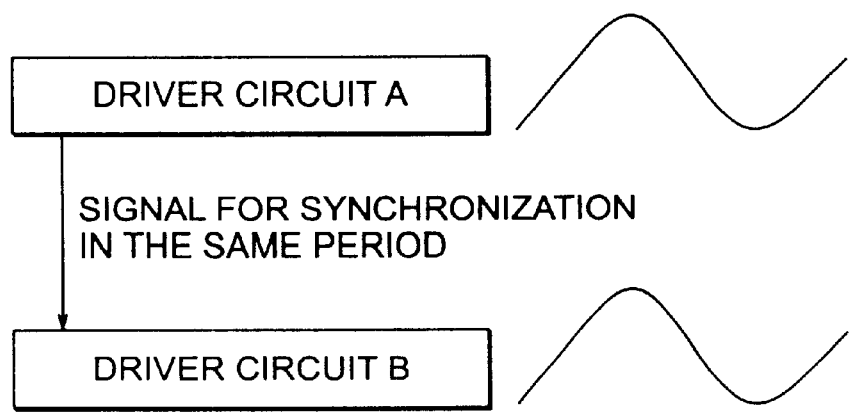
FIG. 3 shows waveforms of two driver circuits that are synchronized with each other.
Figure 10A:
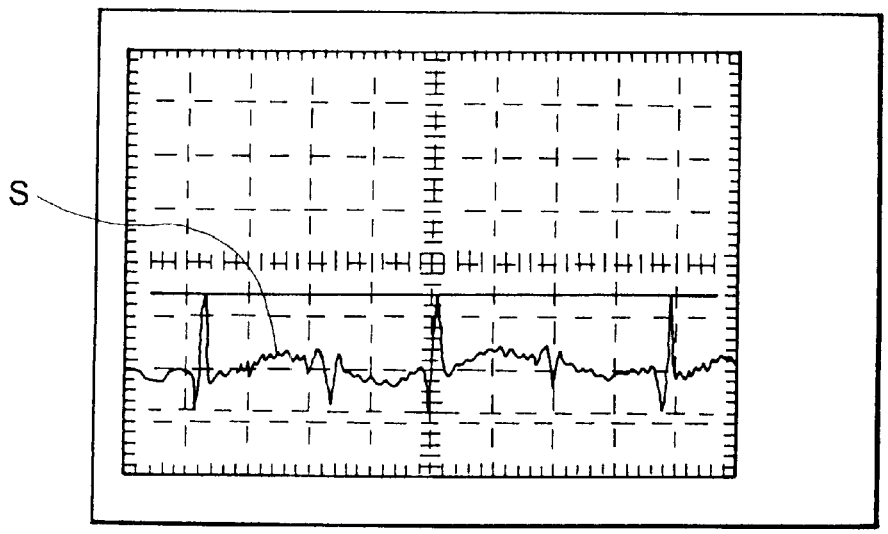
FIG. 10 shows a result of measuring noises in the embodiment of the present invention.

FIGS. 9 and 10 show the result of the test. If the noise quantity on the frame ground (GND) is measured by the conventional configuration as shown in FIG. 1, an oscillation amplitude waveform of the frame noise S including pulse waves and sine waves can be measured on the frame GND as shown in FIG. 9A and FIG. 10A. In this state, when the video signal having the interfering horizontal synchronization frequency is supplied, ripples can be observed on the screen.

Figure 10B:
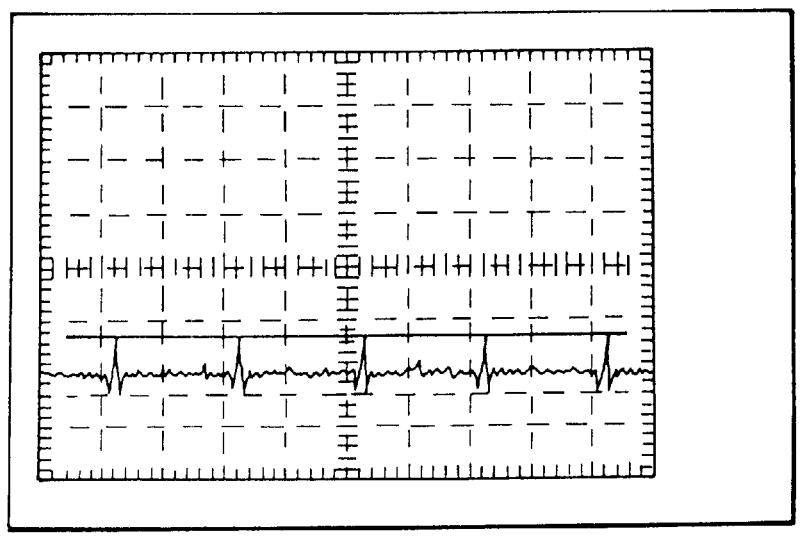

In contrast, if the noise quantity on the frame GND is measured by the configuration of the present embodiment as shown in FIG. 6, the sine wave oscillation amplitude is not observed on the frame GND as shown in FIG. 9B and FIG. 10B. In addition, the peak value of the pulse wave is reduced to approximately 50% compared with the conventional apparatus. In this state, even if the video signal having the interfering horizontal synchronization frequency is supplied, no ripple can be observed on the display screen.

The ripple phenomenon on the display screen is observed as light and dark of the image on the LCD (Liquid Crystal Display) due to the sine wave noise of the frame noise. According to this embodiment, the sine wave noise can be canceled since there are the first and the second backlight whose phases of the oscillation waveforms are opposite to each other. Thus, the generation of the ripple phenomenon can be suppressed.

In this embodiment, one driver circuit is connected to two lamps, and the phase is inverted for every two lamps. However, the present invention can be applied to the configuration in which one driver circuit is connected to one lamp or to more than two lamps.

Figure 11:
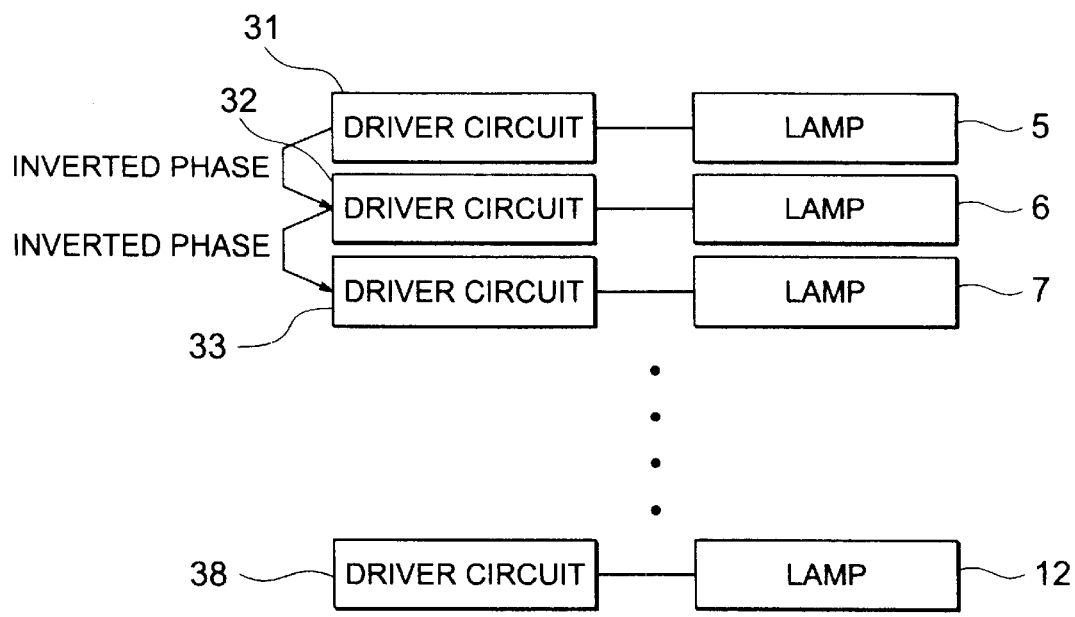
FIG. 11 is a block diagram showing a configuration of a liquid crystal display apparatus according to another embodiment of the present invention.
Figure 12:
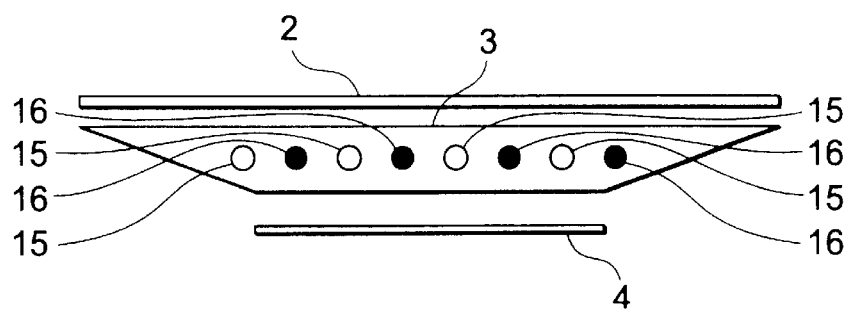
FIG. 12 is a cross section showing the driving state of the lamps 5 through 12 according to the other embodiment of the present invention.

FIGS. 11 and 12 show a block diagram and a schematic cross section of a second embodiment of the present invention, respectively. In the second embodiment, one driver circuit is connected to one lamp, and the phase is inverted for every other lamp. In the configuration shown in FIG. 11, the lamp 6 is driven by the oscillation wave whose phase is opposite to that of the lamp 5, while the lamp 7 is driven by the oscillation wave whose phase is opposite to that of the lamp 6. The lamps 8 through 12 are driven in the same way.

As a result, the lamps 5, 7, 9 and 11 form the first backlight 15 that oscillates in the same period and in synchronization, while the lamps 6, 8, 10 and 12 form the second backlight 16 that oscillates in the opposite phase to the first backlight 15 and in synchronization. FIG. 12 is a cross section that shows a driving state of the lamps 5 through 12. The number of the lamps that form the first backlight 15 is the same as that forming the second backlight

16. The lamps of the first and the second backlight 15 and 16 are arranged alternately one by one.

The plural driver circuits for lighting the backlight can be arranged dispersedly. The backlight can be a direct type backlight, an edge light type backlight or a side light type backlight. Alternatively, the backlight can be one having a single U-shaped lamp or even number of U-shaped lamps, or can be a surface lighting type.

Furthermore, in this embodiment, the first backlight and the second backlight are driven by oscillation waves having opposite phases to each other. However the object of the present invention can be also achieved by driving the first backlight and the second backlight by the oscillation wave having the same period and being synchronized, and by arranging the second backlight at 180 degrees inverted with respect to the first backlight.

While there has been described what are at present considered to be preferred embodiments of the invention, it will be understood that various modifications may be made thereto, and it is intended that the appended claims cover all such modification as fall within the true spirit and scope of the invention.

What is claimed is:

1. A liquid crystal display apparatus, comprising:
    a first backlight; and
    a second backlight which is driven simultaneously with said first backlight, said second backlight having an oscillation wave whose phase is inverted with respect to an oscillation wave of the first backlight.

2. The liquid crystal display apparatus according to claim 1, further comprising a first driver circuit for driving the first backlight and a second driver circuit for driving the second backlight.

3. The liquid crystal display apparatus according to claim 1, wherein the first backlight and the second backlight are made up of a plurality of lamps, respectively.

4. The liquid crystal display apparatus according to claim 3, wherein the number of the lamps for forming the first backlight is the same as that forming the second backlight.

5. The liquid crystal display apparatus according to claim 1, wherein the lamps for forming the first backlight and the lamps for forming the second backlight are arranged alternatively by the same number.

6. The liquid crystal display apparatus according to claim 1, further comprising a plurality of driver circuits for driving the backlights, the plurality of driver circuits being arranged dispersedly.

7. The liquid crystal display apparatus according to claim 1, wherein the backlight is a surface light source.

8. The liquid crystal display apparatus according to claim 1, wherein the backlight is a direct type backlight, an edge light type backlight, a side light type backlight, or a backlight having a single U-shaped lamp or a plurality of U-shaped lamps.

9. A liquid crystal display apparatus, comprising:
    a first backlight; and
    a second backlight which is driven simultaneously with said first backlight, said second backlight having an oscillation wave whose phase is in the same period and in synchronization with respect to an oscillation wave of the first backlight, the second backlight being arranged 180 degrees inverted with respect to the first backlight.

10. The liquid crystal display apparatus according to claim 9, wherein the first backlight and the second backlight are made up of a plurality of lamps, respectively.

11. The liquid crystal display apparatus according to claim 10, wherein the number of the lamps for forming the first backlight is the same as that forming the second backlight.

12. The liquid crystal display apparatus according to claim 9, wherein the lamps for forming the first backlight and the lamps for forming the second backlight are arranged alternatively by the same number.

13. The liquid crystal display apparatus according to claim 9, further comprising a plurality of driver circuits for driving the backlights, the plurality of driver circuits being arranged dispersedly.

14. The liquid crystal display apparatus according to claim 9, wherein the backlight is a surface light source.

15. The liquid crystal display apparatus according to claim 9, wherein the backlight is a direct type backlight, an edge light type backlight, a side light type backlight, or a backlight having a single U-shaped lamp or a plurality of U-shaped lamps.

16. A method for lighting a backlight of a liquid crystal display apparatus, the method comprising the steps of:
    lighting a first backlight; and
    lighting a second backlight simultaneously with said first backlight by inverting phase of an oscillation wave with respect to an oscillation wave of the first backlight.

* * * * *